United States Patent Office 2,899,901
Patented Aug. 18, 1959

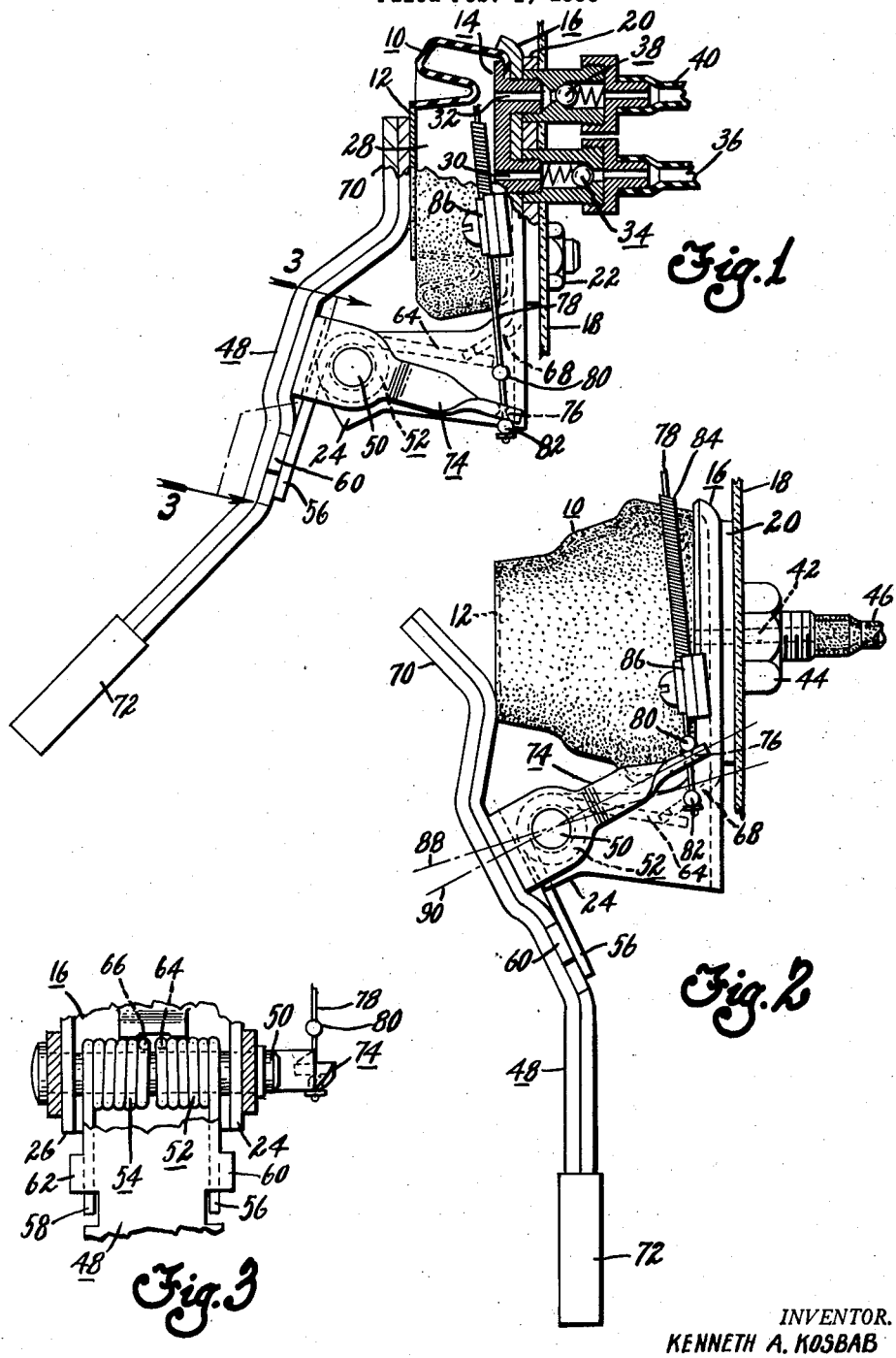

2,899,901

WINDSHIELD WASHER PUMP

Kenneth A. Kosbab, Rochester, N.Y., assignor to General Motors Corporation, Detroit, Mich., a corporation of Delaware Application February 1, 1956, Serial No. 562,773

8 Claims. (Cl. 103—148)

This invention pertains to the windshield washing art, and particularly to a washer pump for discharging a liquid solvent onto a windshield including means for initiating and terminating operation of a wiper motor in timed relation therewith.

Heretofore, it has been proposed to construct a foot operated windshield washer pump comprising a rubber or rubberlike bellows, or bulb, wherein the intake stroke of the pump is effected by the natural recovery characteristic of the bulb, and energy is stored in a spring by manual effort after which, the spring effects the discharge stroke of the pump. A washer pump of this character is disclosed in copending application Serial No. 490,331, Rohr, now Patent No. 2,864,116, and assigned to the assignee of this invention.

The present invention relates to an improved washer pump of the aforesaid type which is of simpler construction, and, consequently, is more economical to manufacture. Accordingly, among my objects are the provision of a pump having a fluid displacing member including energy storing means for effecting one stroke thereof in combination with a manually operable member for storing energy in said means; the further provision of a washer pump including means operable thereby for initiating and terminating operation of a windshield wiper motor in timed relation with operation of the pump; and the still further provision of a foot operated washer pump in which the discharge stroke is effected automatically upon depressing and thereafter releasing the foot pedal.

The aforementioned and other objects are accomplished in the present invention by incorporating torsion spring means in the pump assembly in which energy is stored upon depression of a foot pedal, and whereupon release of the foot pedal permits the energy stored in the spring to effect the delivery stroke of the pump. Specifically, the pump includes a flexible rubber or rubber-like bulb, or bellows, which constitutes the fluid displacing member. The rubber bulb has a natural recovery characteristic that causes it to assume its normal expanded configuration when a deforming force, which can be imposed thereon, is removed. The bulb is attached to a housing assembly, which in one embodiment carries inlet and outlet conduits and check valves, and in another embodiment connects with a single conduit adapted to be connected with a check valve unit associated with a solvent reservoir.

One end of the bulb is secured to a base member of the housing assembly, and the other end of the bulb is closed by a metallic wear plate. The housing assembly also includes a bracket comprising spaced parallel arms within which a foot pedal assembly is pivotally mounted on a trunnion. The trunnion is encompassed by a pair of torsion springs, the outer ends of the two torsion spring engaging the foot pedal assembly, and the inner end of the torsion springs engaging an upturned ear on the housing assembly. The entire pump assembly is mounted on the inside of the vehicle firewall to eliminate deterioration of the parts which would otherwise occur if the pump assembly was mounted in the engine compartment.

The pedal assembly also includes an arm having an aperture therethrough, and a Bowden control wire extends through the aperture. The Bowden wire conduit is secured to the pump housing assembly, and the control wire has attached thereto a pair of spaced balls, or other suitable abutments. Accordingly, when the foot pedal is depressed, energy is stored in the torsion spring means, the bulb assumes its normal shape, thereby effecting the intake stroke of the pump. At the same time, the foot pedal assembly arms engages one of the Bowden control wire abutments, thereby initiating operation of the wiper motor. As soon as the foot pedal assembly is released, the energy stored in the torsion springs compresses the bulb to effect delivery stroke of the washer pump. During the last portion of the pump delivery stroke, the pedal assembly arm engages the other ball on the Bowden control wire and terminates operation of the wiper motor. However, since the wiper motor may be of the type disclosed in copending application Serial No. 481,767, Hart, filed January 14, 1955, now Patent No. 2,832,225, and assigned to the assignee of this invention, it will be appreciated that the wiper blades will make at least one stroke after the manual control switch of the electric wiper motor is shut off, due to the parking mechanism of the wiper motor.

Further objects and advantages of the present invention will be apparent from the following description, reference being had to the accompanying drawing wherein preferred embodiments of the present invention are clearly shown.

In the drawing:

Fig. 1 is a fragmentary view, partly in section and partly in elevation, of one embodiment of a foot operated washer pump constructed according to this invention, after completion of the delivery stroke.

Fig. 2 is a view, in elevation, of another embodiment of a washer pump constructed according to this invention after completion of the intake stroke.

Fig. 3 is a sectional view taken along line 3—3 of Fig. 1.

With particular reference to Fig. 1, a washer pump is shown comprising a flexible rubberlike bulb 10, one end of the bulb 10 is closed by a metallic wear plate 12. The other end of the bulb 10 is secured between a plate assembly 14 and a base member 16. The base member 16 is spaced from the vehicle firewall 18 by a plate 20, and is attached to the firewall 18 by a bolt 22. The plates 14 and 20, and the base member 16 constitute the pump housing assembly, and the base member 16, as seen in Figs. 1 and 3, is formed with a pair of upstanding, spaced arms 24 and 26.

In the embodiment shown in Fig. 1, the interior 28 of the bulb, or bellows, 10 communicates with an intake passage 30 and an outlet passage 32 formed in the plate member 14. The intake passage 30 communicates with a spring-biased check valve assembly 34, which connects with an intake conduit 36 having connection with a solvent reservoir, not shown. The outlet passage 32 communicates with a spring-biased check valve assembly 38, which connects with a delivery conduit 40 having connection with the washer nozzles of the vehicle, not shown.

In the second embodiment depicted in Fig. 2, the interior of the bellows 10 merely communicates with a single passage 42, and the housing assembly is attached to the firewall by a nut 44, which engages a threaded portion of the plate 14. The passage 42 connects with a conduit 46, which is connected to a check valve unit that may be of the type shown in the Bartoo patent 2,717,556. In all other respects, the pump embodiments of Figs. 1 and 2 are identical.

A foot pedal assembly, generally designated by the numeral 48, is pivotally mounted on a trunnion 50 mounted by the spaced arms 24 and 26 of the housing assembly. The trunnion 50 is encompassed by a pair of torsion springs 52 and 54, the outer ends, 56 and 58, respectively, of which engage abutment ears 60 and 62, respectively, of the foot pedal assembly 48. The inner ends 64 and 66 of the torsion springs 52 and 54, respectively, engage an upstruck ear 68 formed on the base member 16. The inner end 70 of the foot pedal assembly engages the wear plate 12 of the pump unit. The outer end of the assembly 48 has suitably secured thereto a pedal cushion 72.

The pedal assembly 48 is also formed with an arm 74 having an aperture 76 therethrough. A Bowden control wire 78 extends through the aperture 76, the Bowden control wire 78 having a pair of spaced abutments 80 and 82 attached thereto, the abutments being in the form of balls. The Bowden wire housing 84 is secured to the base member 16 by a retainer 86.

Operation of the improved foot operated washer pump is as follows. When the pedal assembly 48 is moved from the position of Fig. 1 to the position of Fig. 2, energy is stored in the torsion springs 52 and 54. At the same time, the end 70 of the pedal assembly is moved away from the wear plate 12 of the pump unit whereby the natural recovery characteristic of the rubber bellows 10 will cause the bellows to assume the shape shown in Fig. 2. When the bellows expands from the position of Fig. 1 to the position of Fig. 2, the intake stroke of the pump is effected. Thus, with the pump embodiment of Fig. 1, liquid solvent is drawn through conduit 36 from the reservoir, not shown, through the check valve 34, the passage 30 into the bellows chamber 28. In the embodiment of Fig. 2, liquid solvent is drawn from the reservoir, not shown, through the check valve unit, not shown, conduit 46, passage 42 and into the bellows chamber 28. When the pedal assembly 48 is moved from the position of Fig. 1 to the position of Fig. 2, the arm 74 will move out of engagement with abutment 82 of the Bowden control wire 78 and into engagement with the abutment 80, thereby effecting upward movement of the Bowden control wire, or wiper motor control element, so as to initiate operation of the wiper motor, not shown.

When the foot pedal assembly 48 is released, the energy stored in the torsion spring means will cause the pedal assembly 48 to move from the position of Fig. 2 to the position of Fig. 1, thereby compressing the bellows 10 and effecting the discharge stroke of the pump. In the Fig. 1 embodiment, liquid solvent from the bellows chamber 28 is delivered through passage 32, the check valve 38, and the conduit 40 to the washer nozzles, not shown. In the Fig. 2 embodiment, liquid solvent from the bellows chamber 28 is delivered through the passage 42, the conduit 46, and the check valve unit, not shown, to the washer nozzles, not shown. When the arm 74 of the pedal assembly 48 moves from the dotted line position 90 to the dotted line position 88, it will engage the abutment 82 and shortly thereafter will shut off the wiper motor manual control member. Thus, while the wiper motor manual control member is shut off slightly before completion of the pump delivery stroke, as pointed out hereinbefore, if the wiper motor is of the type referred to in the aforementioned copending application Serial No. 481,767, the wiper blades will make at least one stroke after the electric motor manual control switch is shut off.

From the aforegoing, it is apparent that the present invention results in a foot operated washer pump wherein the delivery stroke of the pump is effected automatically after depression and release of the foot pedal. Moreover, the instant washer pump unit is of simple construction, extremely compact in design and economical to manufacture.

While the embodiments of the present invention as herein disclosed, constitute a preferred form, it is to be understood that other forms might be adopted.

What is claimed is as follows:

1. A windshield washer pump unit including, an elastic bulb having a natural recovery characteristic, torsion spring means for compressing said bulb to effect the delivery stroke of said pump unit, and manual means engageable with and disengageable from said bulb and operatively connected with said torsion spring means for storing energy in said torsion spring means to allow said bulb to resume its expanded shape due to its natural recovery characteristic and thereby effect the intake stroke of said pump unit.

2. A windshield washer pump unit including, an elastic bulb having a natural recovery characteristic, spring means for compressing said bulb to effect the delivery stroke of said pump unit, a manually operable, pivotally mounted member engageable with and disengageable from said bulb, and means interconnecting said member, and said spring means for storing energy in said spring means whereby said bulb will be allowed to resume its expanded shape due to its natural recovery characteristic and effect the intake stroke of the pump unit when energy is stored in said spring means and said member is disengaged from said bulb.

3. A windshield wiper pump unit including, an elastic bulb, a manually operable, pivotally mounted member engageable with and disengageable from said bulb, and spring means engageable with said member whereby pivotal movement of said member in one direction will disengage the member and the bulb to stress said spring means and permit said bulb to resume its expanded shape and pivotal movement of said member in the other direction by said spring means will engage the member with the bulb to compress said bulb.

4. A windshield washer pump unit including, an elastic bulb having a natural recovery characteristic, a manually operable member engageable with and disengageable from said bulb, means pivotally supporting said member, and torsion spring means encircling said pivot means whereby pivotal movement of said member in one direction will disengage the member from the bulb and stress said spring means to store energy therein and permit said bulb to resume its expanded shape due to its natural recovery characteristic, and pivotal movement of said member in the other direction by said spring means will engage the member with the bulb to compress said bulb.

5. The windshield washer pump unit set forth in claim 4 including a stationary base member, and wherein said torsion spring means comprises a pair of torsion springs, one end of each torsion spring engaging said movable member and the other end of each torsion spring engaging said stationary base member.

6. The windshield washer pump unit set forth in claim 4 wherein said bulb is mounted on a housing assembly having an upstruck tang, and wherein said torsion spring means comprises at least one torsion spring, one end of which engages said member and the other end of which engages said tang.

7. The windshield washer pump unit set forth in claim 6 wherein the pivot means comprises a trunnion, and wherein said torsion spring is elongate and includes a portion encircling said trunnion.

8. A windshield washer pump including, a base, an elastic bulb having a natural recovery characteristic, one end of said bulb being attached to said base, a wear plate attached to the other end of said elastic bulb, a manually operable member pivotally attached to said base and having a portion engageable with and disengageable from the wear plate attached to said bulb, and torsion spring means having one end engaging said base and the other end engaging said manually operable member whereby pivotal movement of said member in one direction will disengage the member from the wear plate of said bulb and stress said torsion spring means to permit the bulb to expand due to its natural recovery characteristic, and pivotal movement of said member in the other direction by said torsion spring means will engage the member with the wear plate of said bulb to compress said bulb.

References Cited in the file of this patent

UNITED STATES PATENTS

| | | |
|---|---|---|
| 2,206,814 | Horton | July 2, 1940 |
| 2,717,556 | Bartoo | Sept. 13, 1955 |
| 2,743,473 | Oishei | May 1, 1956 |

FOREIGN PATENTS

| | | |
|---|---|---|
| 682,414 | France | Feb. 11, 1930 |